United States Patent
Umeda et al.

(10) Patent No.: US 7,142,847 B2
(45) Date of Patent: Nov. 28, 2006

(54) MOBILE COMMUNICATION SYSTEM, RESOURCE SWITCHING METHOD THEREOF, NETWORK CONTROL APPARATUS INCLUDED THEREIN, SAME AND NETWORK CONTROL METHOD

(75) Inventors: Narumi Umeda, Yokohama (JP);
Tsutomu Yokoyama, Yokohama (JP);
Sadayuki Hongo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 10/089,081

(22) PCT Filed: Aug. 10, 2001

(86) PCT No.: PCT/JP01/06937

§ 371 (c)(1),
(2), (4) Date: Apr. 10, 2002

(87) PCT Pub. No.: WO02/15630

PCT Pub. Date: Feb. 21, 2002

(65) Prior Publication Data
US 2002/0150228 A1    Oct. 17, 2002

(30) Foreign Application Priority Data
Aug. 10, 2000   (JP) .............................. 2000-243289

(51) Int. Cl.
*H04M 3/00*         (2006.01)
(52) U.S. Cl. ................. 455/418; 455/414.3; 455/414.1
(58) Field of Classification Search ............. 455/414.1, 455/414.2, 414.4, 418, 419, 456.1, 456.3, 455/67.11, 550.1, 560, 569.1, 566

See application file for complete search history.

(56) References Cited

U.S. PATENT DOCUMENTS

| | | | |
|---|---|---|---|
| 5,278,866 A * | 1/1994 | Nonami ...................... 375/227 |
| 5,950,123 A * | 9/1999 | Schwelb et al. .......... 455/414.4 |
| 6,684,087 B1 * | 1/2004 | Yu et al. ..................... 455/566 |
| 6,728,531 B1 * | 4/2004 | Lee et al. ................... 455/419 |
| 6,738,614 B1 * | 5/2004 | Blankenship et al. .... 455/414.4 |

FOREIGN PATENT DOCUMENTS

| | | |
|---|---|---|
| EP | 1 024 676 | 8/2000 |
| GB | 2 322 051 | 8/1998 |
| JP | 4-276922 | 10/1992 |

(Continued)

OTHER PUBLICATIONS

Patent Abstracts of Japan, JP 11-161571, Jun. 18, 1999.

(Continued)

*Primary Examiner*—Matthew D. Anderson
*Assistant Examiner*—Lewis West
(74) *Attorney, Agent, or Firm*—Oblon, Spivak, McClelland, Maier & Neustadt, P.C.

(57) ABSTRACT

The present invention relates to a mobile communication system comprising a structure for realizing "network seamless" for roaming between different kinds of networks, "contents seamless" for converting different kinds of encoding or media therebetween, and "device seamless" for making it possible to utilize optimum I/O devices in conformity to surrounding environments. This mobile communication system detects a change in an environment in use concerning an object such as a mobile terminal, for example, notifies at least one apparatus relating to the change of the result of detection, sets various resources constituting a network in conformity to a new environment, and switches them. This makes it possible to construct a seamless network which automatically eliminates seams (restrictions) concerning changes in the environment and the like.

16 Claims, 8 Drawing Sheets

FOREIGN PATENT DOCUMENTS

| | | |
|---|---|---|
| JP | 6-61903 | 3/1994 |
| JP | 7-154859 | 6/1995 |
| JP | 9-54730 | 2/1997 |
| JP | 11-17806 | 1/1999 |
| JP | 11-161571 | 6/1999 |
| JP | 11-252041 | 9/1999 |

OTHER PUBLICATIONS

Patent Abstracts of Japan, JP 11-252041, Sep. 17, 1999.
Patent Abstracts of Japan, JP 6-61903, Mar. 4, 1994.
Patent Abstracts of Japan, JP 4-276922, Oct. 2, 1992.
Patent Abstracts of Japan, JP 9-54730, Feb. 25, 1997.

* cited by examiner

| ID No. | BEFORE CONVERSION | | AFTER CONVERSION | |
|---|---|---|---|---|
| | MEDIA | ENCODING RATE | MEDIA | ENCODING RATE |
| 1 | AUDIO | 12.2kbit/s | AUDIO | 8kbit/s |
| 2 | TEXT | 8kbit/s | AUDIO | 8kbit/s |
| 3 | AUDIO | 8kbit/s | TEXT | 8kbit/s |
| 4 | MOVING IMAGE | 64kbit/s | STILL IMAGE | 16kbit/s |
| | | | | |

MOBILE COMMUNICATION SYSTEM, RESOURCE SWITCHING METHOD THEREOF, NETWORK CONTROL APPARATUS INCLUDED THEREIN, SAME AND NETWORK CONTROL METHOD

TECHNICAL FIELD

The present invention relates to a mobile communication system, a resource switching method thereof, and a network control apparatus and network control method included in the same.

BACKGROUND ART

Conventional mobile communication systems have been realized as information providing systems in which users operate mobile terminals (mobile stations) so as to connect them to the Internet and browse, via the mobile terminals, web information provided by WWW servers. Examples of such information providing systems include i-scheme service (service name) provided by NTT DoCoMo, Inc., and the like.

DISCLOSURE OF THE INVENTION

The inventors studied the conventional mobile communication systems and, as a result, have found the following problems. Namely, while browsing information via a mobile terminal concerning an information providing service in the conventional mobile communication systems, a user cannot interchange visual information and audio information with each other without manually switching contents even when images shown on a display become invisible due to the surrounding darkness, the user rides on a train or bus, and so forth, for example. In other words, there have been no mobile communication systems which can browse web information items provided by WWW servers while switching them in response to environments in which mobile terminals are used.

Also, there have been no mobile communication systems enabling contents to be automatically switched, for example, when a user browsing information via a mobile terminal changes the terminal for browsing information. Further, there have been no mobile communication systems which can browse network resources while switching them according to contents to be browsed, for example, in the case where provided contents are changed from visual information to audio information, unless a user browsing information via a mobile terminal manually switches the network resources.

For overcoming the above-mentioned problems, it is an object of the present invention to provide a mobile communication system comprising a structure for automatically eliminating various seams (restrictions) in mobile communications and making it possible to construct a seamless network which can respond to environmental changes and the like, a resource switching method therefor, a network control apparatus included in the same and a network control method.

For achieving the above-mentioned object, the mobile communication system according to the present invention comprises, at least, detecting means, reporting means, setting means, and switching means. The detecting means detects at least a change in an environment in which an object to be inspected exists and a change in a capability of the object to be inspected. The reporting means notifies at one or more apparatuses relating to the change detected by the detecting means of at least a result of the detection. The setting means newly sets at least one of a network resource and an information format in conformity to the change detected by the detecting means. Then, the switching means switches the network resources and information format into a content set by the setting means.

In the mobile communication system comprising the configuration mentioned above, the object to be inspected includes at least one of a communication terminal, transmission means for a radio area, and transmission means within a network. The network resource includes at least one of a wireless communication channel, a transmitter/receiver, a line within a network, a communication node apparatus, a communication terminal, an information switching apparatus, and an information converting apparatus.

In the mobile communication system according to the present invention, the switching means includes information converting apparatus which carries out, as the switching of information format, changing of media (sound, image, text, etc.) transferred over a network or changing of a transmission quality in the same media such as encoding scheme and encoding rate. Here, the information converting apparatus includes, at least, a network interface section, an information converting section, and a control section. The network interface section transmits/receives information to/from a resource constituting a network. The information converting section converts the format of information captured by way of the network interface section into another format, and transmits thus converted information onto the network by way of the network interface section. The control section controls the information converting section according to an instruction from a network control section controlling the network.

The network control method according to the present invention successively executes a receiving step, a determining step, and a controlling step. Here, the receiving step receives a detection report of at least one of a change in an environment in which an object to be inspected exists and a change in a capability of the object to be inspected from the object to be inspected. The determining step determines at least one of a network resource and an information format suitable for the change specified by the detection report received from the object to be inspected. The controlling step controls the object to be inspected concerning at least one of the determined network resource and information format so that the object conforms to the detected change. The network control apparatus realizing such a network control method comprises receiving means, determining means, and control means for executing the receiving step, determining step, and controlling step respectively.

The resource switching method of the mobile communication system comprising the structure mentioned above comprises a detecting step, a reporting step, a setting step, and a switching step. The detecting step detects at least one of a change in an environment in which an object to be inspected exists and a change in a capability of the object to be inspected. The reporting step notifies at least one of apparatus relating to the change detected by the detecting means of a result of the detection. The setting step newly sets at least one of a network resource and an information format in conformity to the change detected by the detecting step. Then, the switching step switches the network resource and information format into a content newly set by the setting step. Specifically, the switching step includes, as the switching of information format, a step of changing media (sound, image, text, etc.) transferred over a network or changing a transmission quality in the same media such as encoding scheme and encoding rate.

In the mobile communication system according to the present invention and the resource switching method thereof, as mentioned above, when a change in an environment in use or the like concerning an object is detected in any of apparatus in the mobile communication system, e.g., a mobile terminal, an information processing apparatus connected thereto, a node within a network, and a node connected to the network, the change in environment or the like is reported to at least one apparatus relating to the change, and various resources are set up in thus notified apparatus so as to respond to the new environment or the like and switched. Thus, the mobile communication system and the resource switching method thereof automatically eliminate various seams (restrictions) in mobile communications, thereby making it possible to construct a seamless network which can respond to various environmental changes. Namely, the mobile communication system and the resource switching method thereof enable "network seamless" for roaming between different kinds of networks, "contents seamless" for converting different kinds of encoding or media therebetween, and "device seamless" for making it possible to utilize optimum I/O devices in conformity to surrounding environments. Also, such a configuration efficiently detects changes in electromagnetic wave environments in wireless areas, changes in environments surrounding terminals, changes in capabilities of terminals, changes in transmission networks, changes in provided contents, and the like.

Here, "transmission means for a radio area" refers to a wireless communication channel for transmitting information, apparatus for transmitting/receiving information in this channel, and the like. Setting parameters of the wireless communication channel vary depending on wireless access schemes. In FDMA scheme, for example, the wireless channel is represented by a radio frequency. It is represented by a radio frequency and a slot number in TDMA scheme, and by a radio frequency and a spreading code in CDMA scheme. On the other hand, "transmission means within a network" is a line connecting communication nodes, and includes various schemes such as STM, ATM, and WDM. A communication node apparatus for carrying out communications by a line, and the like are included in the "transmission means within a network." Further, "network resource" refers to transmission means for transmitting information, for example, such as wireless communication channels, transmitters/receivers, lines within a network, communication node apparatus, communication terminals, and the like. Information switching apparatus, information converting apparatus, and the like are also included in the "network resource."

Embodiments according to the present invention will become more fully understood from the detailed description given hereinbelow. These embodiments are given by way of illustration only, and thus should not be considered limitative of the present invention.

Also, further scope of applicability of the present invention will become apparatus from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

BEST SCHEMES FOR CARRYING OUT THE INVENTION

In the following, embodiments of the mobile communication system according to the present invention and the resource switching method thereof will be explained with reference to FIGS. 1 to 10. In the explanation of the drawings, parts and constituents identical to each other will be referred to with numerals or letters identical to each other without repeating their overlapping descriptions.

Figure 1:
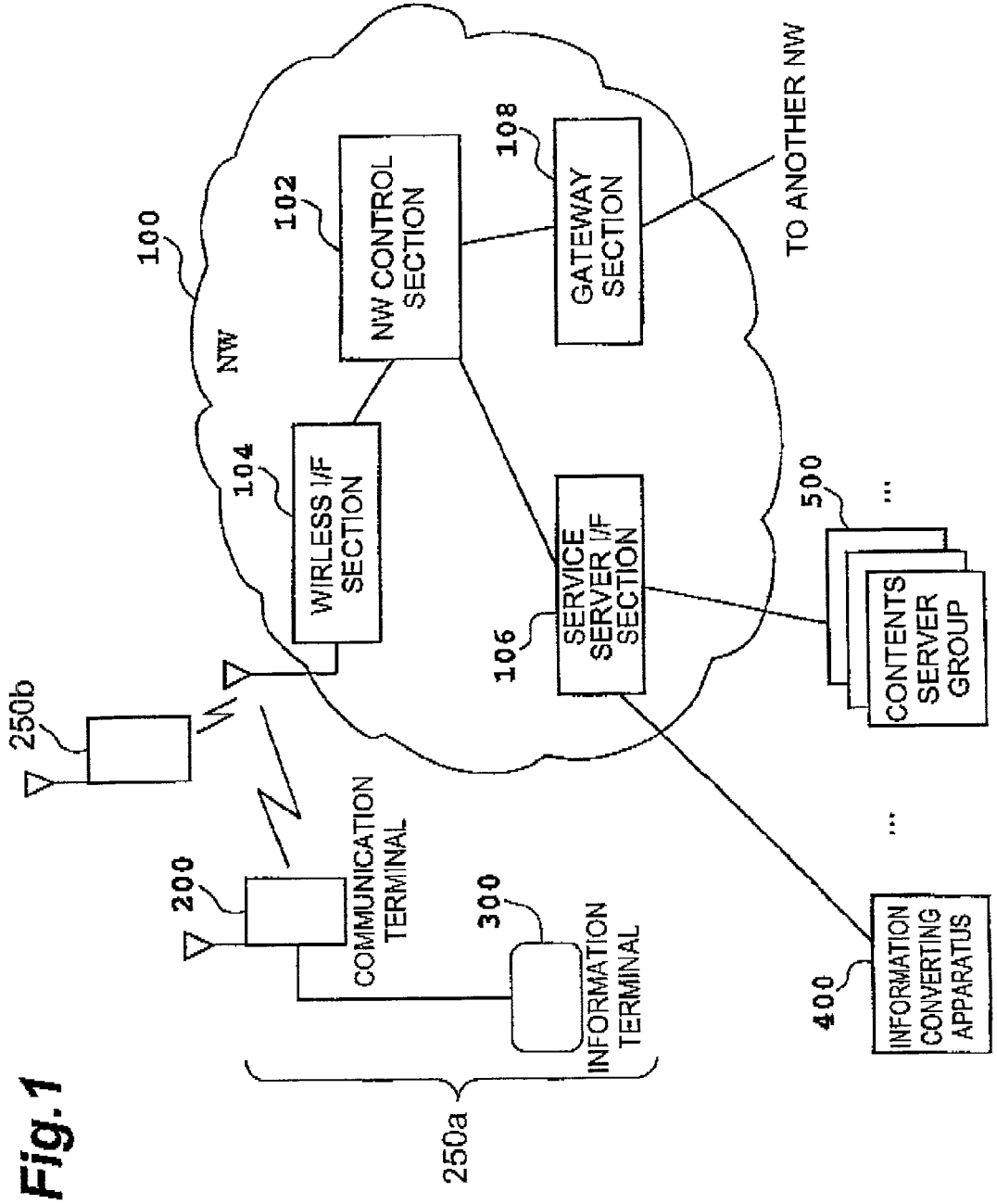
FIG. 1 is a diagram showing an example of schematic configuration of the mobile communication system according to the present invention.

FIG. 1 is a diagram showing an example of schematic configuration of the mobile communication system according to the present invention. This mobile communication system comprises, at least, a network NW100, information communication terminals, an information converting apparatus 400 connected to the network NW100, and a contents server group 500. The information communication terminals include a separate type information communication terminal 250a constituted by a communication terminal 200 and an information terminal 300 connected thereto, and an integrated information communication terminal 250b in which they are integrated together.

The network NW100 includes an NW control section 102, a wireless interface section 104, a service server interface section 106, and a gateway section 108; connects the communication terminal 200, information converting apparatus 400, and contents server group 500 to each other; and switches lines and packets for mobile communications. The network NW100 may include one of networks such as the Internet, intranet, LAN (either wired or wireless), public telephone network, (either analog or digital), mobile line switching network/mobile packet switching network of PDC/PDC-P scheme or the like, paging network, PHS network, and satellite communication network. Also, the network NW100 includes a network connected to a plurality of routers through which packets are transmitted while being routed.

The NW control section 102 is connected to the wireless interface section 104, service server interface section 106, and gateway section 108; comprises a storage for storing network control programs, programs specifying various communication processing procedures, and required data; and controls the network NW100. The wireless interface section 104 is connected to the NW control section 102 and enables wireless communications with the communication terminal 200. The service server interface section 106 is connected to the NW control section 102, and has an interface function with the information converting apparatus 400 and contents server group 500. The gateway section 108 is connected to the NW control section 102, and has a gateway function with respect to other networks.

Figure 2:
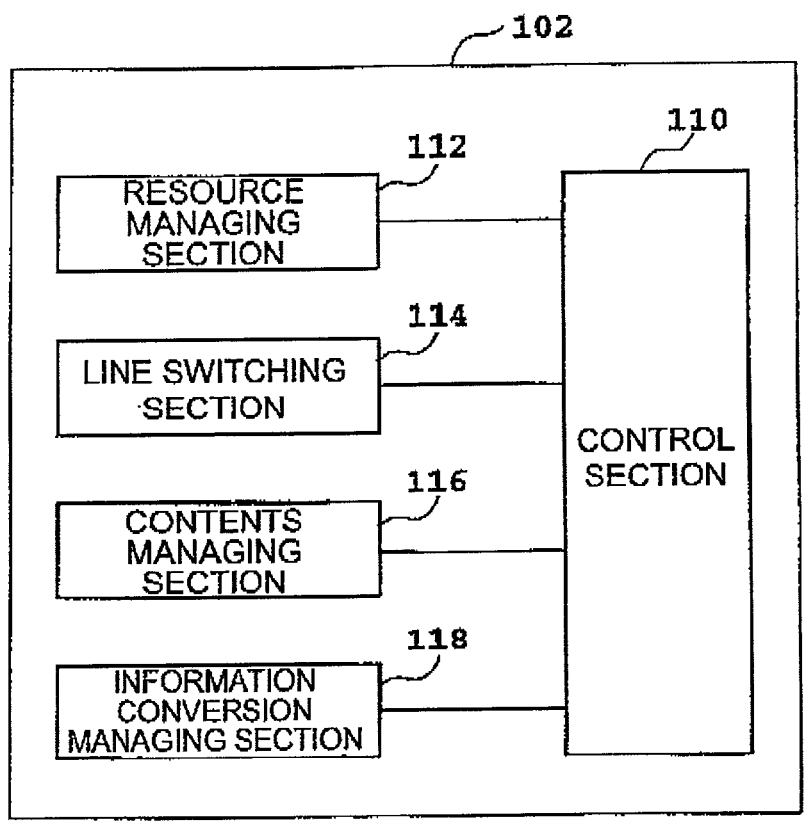
FIG. 2 is a block diagram showing a schematic configuration of the NW control section 102 shown in FIG. 1.

FIG. 2 is a block diagram showing a schematic configuration of the NW control section 102 shown in FIG. 1. The NW control section 102 is depicted in FIG. 1 as being concentrated at one location within the network 100. However, the NW control may also be carried out at a plurality of locations in a decentralized manner (i.e., a plurality of NW control sections may be provided within the network NW 100). When the network NW100 is formed by a plurality of routers and transmnission lines and the like connecting them, for example, the NW control section may be constituted by the plurality of routers.

The configuration and operation of the NW control section 102 will now be explained.

The NW control section 102 comprises, at least, a control section 110, a resource managing section 112, a line switching section 114, a contents managing section 116, and an information conversion managing section 118. The control section 110 controls the whole NW control section 102 in a centralized manner. Also, the control section 110 controls mutual information exchanges between a plurality of function blocks connected thereto. Further, as required, the control section 110 instructs the resource managing section 112 to change amounts of allocation of various resources assigned to or used in terminals, calls, flows, or sessions under control or stop allocating them. In addition, when communications are newly started, the control section 110 instructs the resource managing section 112 to allocate resources. On the other hand, concerning terminals, calls, flows, or sessions under control, the control section 110 instructs the line switching section 114 to switch lines for transmitting information within the network NW100 or carry out line switching/routing control for switching packet routing in the case of a packet network as required. Also, the control section 110 orders routing control of information signals from other networks as required. The control section 110 instructs the contents managing section 116 on media, encoding schemes, encoding rates, and the like of information being communicated or about to be communicated for each terminal, call, flow, or session. When information exchange is necessary in terminals, calls, flows, or sessions under control, the control section 110 instructs the information conversion managing section 118 on information media, encoding schemes, encoding rates, and the like before and after conversion.

The resource managing section 112 is connected to the control section 110, and orders changes in allocation of various resources (resource management) such as the wireless interface section 104, wired/wireless information transmission lines within the network NW100 such as wired transmission lines within the network which are not depicted, and apparatus for transmission, and amounts of allocation of resources for each terminal, call, flow, or session. The line switching section 114 is connected to the control section 110 and controls operations of the gateway section 108. The line switching section 114 not only controls routing of information signals from other networks, but also switches lines for transmitting information within the network NW100 and carries out switching control (line switching/routing control) of packet routing for each terminal, call, flow, or session in a packet network.

On the other hand, the contents managing section 116 is connected to the control section 110. For each terminal, call, flow, or session, the contents managing section 116 manages provided contents, information media, encoding schemes, encoding rates, and the like, and orders media, encoding schemes, encoding rates, and the like of information being communicated or exchanges information with the service server group 500 and information converting apparatus 400 by way of the service server interface section 106 as required.

The information conversion managing section 118 is connected to the control section 110. The information conversion managing section 118 determines whether or not information conversion is required for a terminal, call, flow, or session, and manages information media, encoding schemes, encoding rates, and the like before and after conversion when it is determined that the information conversion is necessary. Also, when necessary, the information conversion managing section 118 instructs, by way of the service server interface section 106, the service server group 500 and information converting apparatus 400 on media, encoding schemes, encoding rates, and the like of information being communicated or exchanges information therewith.

The communication terminal 200 shown in FIG. 1 is connected to the information terminal 300, and carries out wireless communications with the wireless interface section 104. Here, the communication terminal 200 may be any of a pager, a PHS terminal a mobile terminal (including one conforming to IMT-2000), a mobile information terminal (PDA) equipped with a communication function, and the like. In particular, the mobile terminal may be one having an email function or a function of getting access to the Internet (e.g., an i-scheme (service name) terminal provided by NTT DoCoMo, Inc. (company name), and the like).

Figure 3:
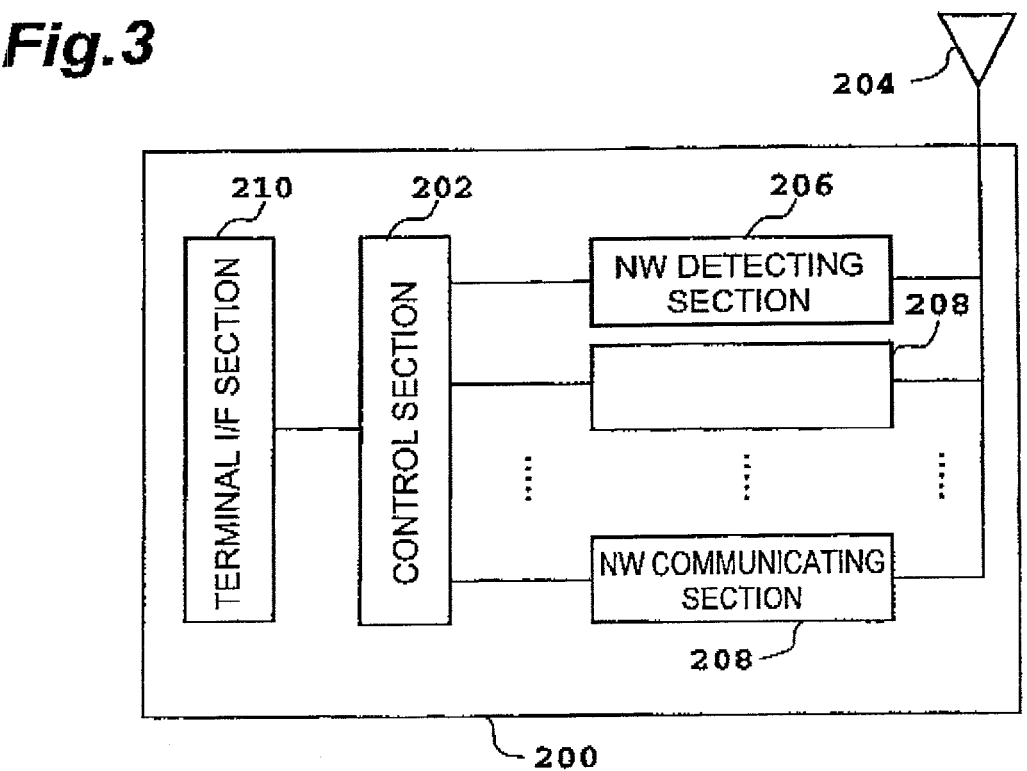
FIG. 3 is a block diagram showing a schematic configuration of the communication terminal shown in FIG. 1.

FIG. 3 is a block diagram showing a schematic configuration of the communication terminal 200 shown in FIG. 1. The communication terminal 200 comprises, at least, a control section 202, an antenna section 204, a network detecting section 206, network communicating sections 208, and a terminal interface section 210. The control section 202 controls the whole communication terminal 200 in a centralized manner. The antenna section 204 is connected to the network detecting section 206 and network communicating sections 208, and enables wireless communications with the wireless interface section 104. The network detecting section 206 is connected to the control section 202 and antenna section 204, and detects at least one network NW100 to which the communication terminal 200 is connected. The network communicating sections 208 are connected to the control section 202 and antenna section 204, and carries out communications with at least one network NW100 detected by the network detecting section 206. The terminal interface section 210 is connected to the control section 202, and has an interface function with the information terminal 300.

The information terminal 300 shown in FIG. 1 is connected to the communication terminal 200, and browses contents from the contents server group 500 by way of the network NW100. Also, the information terminal 300 comprises a structure for detecting an environment (status of placement) in which it exists. For example, the information terminal 300 can be realized if peripherals such as various sensors, printers, displays, and image scanners are connected to an information processing apparatus including known personal computers, workstations, and information processing terminals such as PDA while software (including programs, data, and the like) for realizing information providing services of the mobile communication system according to the present invention is installed in the information processing apparatus.

Figure 4:
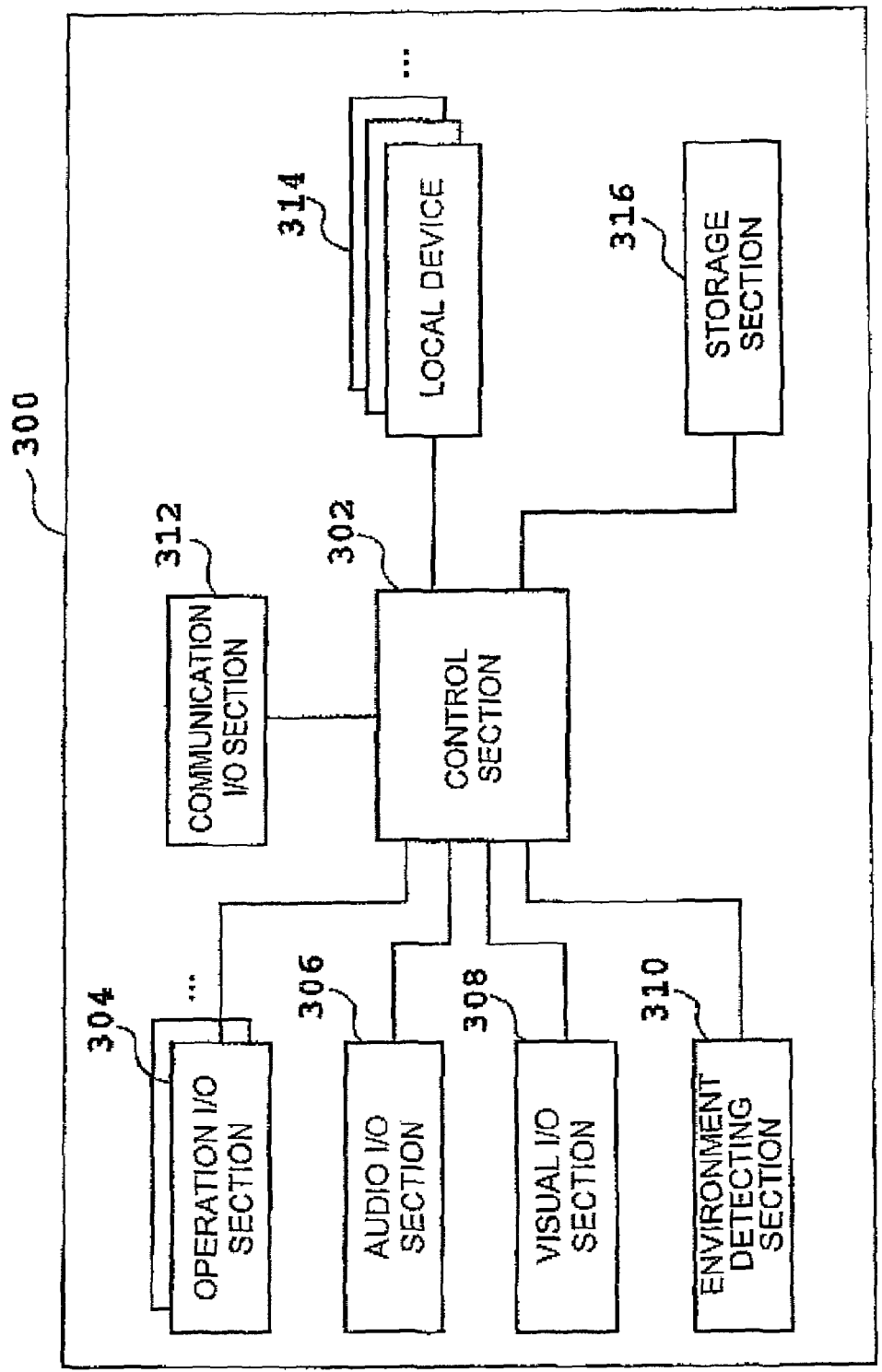
FIG. 4 is a block diagram showing a schematic configuration of the information terminal shown in FIG. 1.

FIG. 4 is a block diagram showing a schematic configuration of the information terminal 300 shown in FIG. 1. The information terminal 300 comprises, at least, a control section 302, operation I/O sections 304, an audio I/O section 306, a visual I/O section 308, an environment detecting section 310, a communication interface 312, local devices 314, and a storage section 316. The control section 302 controls the whole information terminal 300 in a centralized manner. The control section 302 has an internal memory for storing control programs such as an OS (Operating system), programs defining various processing procedures and the like, and required data; and carries out various information processing operations according to these programs and the like. The operation I/O sections 304 are connected to the control section 302, and makes it possible to input/output operations. The operation I/O sections 304 include, for example, various pointing devices such as a mouse, keyboards, image scanners, and digitizers operated by users. The audio I/O section 306 is connected to the control section 302 and includes, for example, microphones, speakers, and the like which make it possible to input/output sounds. The visual I/O section 308 is connected to the control section 302 and includes, for example, video cameras, digital cameras, and display apparatus such as displays which make it possible to input/output images. The environment detecting section 310 is connected to the control section 302 and includes apparatus for detecting an environment in which the information terminal 300 is placed, for example, such as apparatus for detecting an electromagnetic wave environment, apparatus for detecting surrounding environment information (e.g., inside a train or bus, inside a theater, hospital, or the like, etc.) reported from the outside by local wireless means such as Bluetooth, apparatus for detecting the outside brightness, and temperature detecting apparatus. The detecting means for detecting changes in an environment in which the object to be inspected exists may also be provided in other apparatus such as the communication terminal 200. The communication terminal 312 is connected to the control section 302, and has an interface function with the terminal interface section 210 of the communication terminal 200. The local devices 314 are connected to the control section 302, and realize respective functions. The storage section 316 is storage means such as memory devices like RAM and ROM, fixed disk devices such as hard disks, flexible disks, and optical disks; and stores various tables, files, databases, and the like for use in various processing operations.

The information communication terminal 250b shown in FIG. 1 is an integrated information communication terminal equipped with the function of the communication terminal 200 and the function of information terminal 300, and comprises constituents similar to those of the communication terminal 200 and information terminal 300.

In the embodiment comprising the foregoing configuration, the information terminal 300 carries out wireless communications with the network NW100 by way of the communication terminal 200, so as to receive data concerning contents provided by the contents server group 500, thereby making it possible to browse the contents by utilizing a browser incorporated therein. As will be shown in detail in the following, if a change in an environment or the like concerning an object is detected here in any apparatus of the mobile communication system, at least one apparatus relating to the change in environment or the like is notified of the result of detection. In thus notified apparatus, various resources are set up so as to respond to the changed environment, and they are automatically switched.

Figures 5, 6:
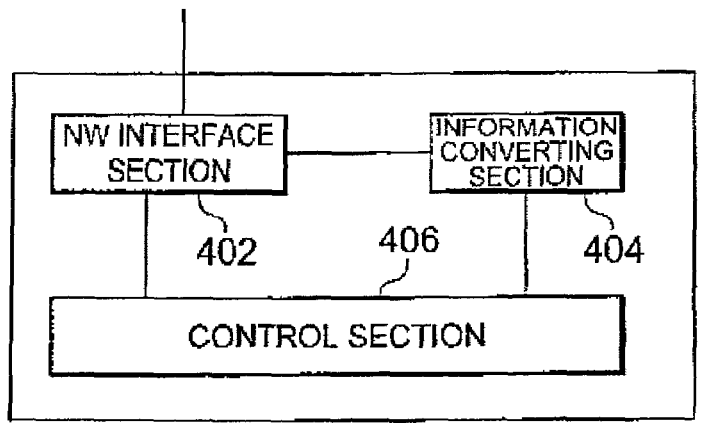
FIG. 5 is a block diagram showing a schematic configuration of the information converting apparatus shown in FIG. 1.
FIG. 6 is a table for explaining an example of information conversion carried out in the information converting apparatus shown in FIG. 5.

FIG. 5 is a block diagram showing the configuration of the information converting apparatus 400 shown in FIG. 1.

The information converting apparatus 400 has a function of converting contents from the contents server group 500 or information from a communication terminal existing in the network NW100 or in other networks into another information format according to an instruction from the NW control section 102. As shown in FIG. 5, the information converting apparatus 400 comprises an NW interface section 402, an information converting section 404, and a control section 406. The NW interface section 402 is connected to the service server I/F section 106 in the network NW100, and transmits/receives signals to/from the NW control section 102 and contents server group 500. The information converting section 404 is connected to the NW interface section 402 and control section 406, and converts information signals of the contents fed from the NW interface section 402 into another information format according to an instruction from the control section 406. The control section 406 receives an instruction concerning the information conversion from the NW control section 102 by way of the NW interface section 402, and notifies the information converting section 404 of thus instructed information.

The information converting section 404 has at least one function necessary for the system selected from a function (first function) of changing a transmission quality such as encoding scheme and encoding rate in the same media and a function (second function) of changing the media itself. An example of the first function corresponds to a case where the encoding rate of 12.2 kbit/s is converted to that of 8 kbit/s in audio media. Also, even in the case of encoding the same sound, there are various audio encoding schemes depending on differences in encoding rates and sound qualities. The above-mentioned first function also includes functions of converting information between the audio encoding schemes. An example of the second function corresponds to a case where text information is converted into audio information. Namely, it is a function of reading out text information by use of a speech synthesizing technique or the like. The second function also includes a case where audio information is converted into text information by use of a speech recognition technique or the like. Further, various information conversions such as conversion of visual information into audio information explaining the image thereof can be considered. FIG. 6 is a table showing a plurality of examples concerning the information conversions mentioned above.

The information converting apparatus 400 comprising the structure mentioned above operates if it is determined that an information conversion is necessary when carrying out communications in the NW control section 102. Namely, in the NW control section 102, whether an information conversion is necessary or not is determined according to an environment or resource status in a call, flow, or session for carrying out communications or in communications being carried out. If it is determined that the information conversion is necessary in the NW control section 102, information indicating this fact will be reported to the information converting apparatus 400 by way of the service server I/F section 106. Therefore, such an indication of information conversion is carried out for each call, flow, or session.

In the information converting apparatus 400, thus reported information indicative of the information conversion is fed into the control section 406 by way of the NW interface section 402. According to thus indicated contents, the control section 406 instructs the information converting section 404 on the information conversion matching the indicated contents.

An example of the instruction from the control section 406 to the information converting section 404 is an indication of information conversion such as one shown in FIG. 6. The ID numbers in FIG. 6 are those for identifying terminals, calls, flows, or sessions. For example, the first example (ID No. 1) shown in FIG. 6 is an information conversion corresponding to the above-mentioned first function. In this case, the control section 406 instructs the information converting section 404 to convert audio information at 12.2 kbit/s into that at 8 kbit/s. Upon this instruction, a sound at 12.2 kbit/s inputted by way of the NW interface section 402 is converted into that at 8 kbit/s in the information converting section 402 and then is outputted to the NW interface section 402 again. Thus converted sound (audio information) at 8 kbit/s is transmitted by way of the service server I/F section 106 to the aimed terminal of the call, flow, or session corresponding to ID No. 1. The second and third examples (ID Nos. 2 and 3) shown in FIG. 6 are information conversions between text and sound corresponding to the second function, whereas the fourth example shown in FIG. 6 is an information conversion between moving and still images corresponding to the second function.

Object to Detect Change

The object to be inspected may be a change in an electromagnetic wave environment in transmission means for a radio area. The change in electromagnetic wave environment corresponds to a change (decrease) in a transmission quality in a case where a communicating terminal is moving indoors from the outdoors, or an amelioration of a transmission quality attained when the site of communication is moved from a location such as a shade of a building where the electromagnetic wave is in a weak state to a location such as the outside of shade where the state of electromagnetic wave is improved, for example. Also, when a terminal is moved, the electromagnetic wave of the cell currently in communication may become so weak that electromagnetic waves in its neighboring cell become stronger. As a method of determining them, changes in the electromagnetic wave environment may be detected in the communication terminal 200 according to cell determination (e.g., comparison of reception levels of "perch channel" in surrounding cells) or transmission quality monitoring (e.g., measurement of SIR, the bit error rate of a pilot signal, transmission delay, and the like).

A case carrying out the cell determination will now be explained. In cellular type mobile communications, an area is covered with a plurality of cells. Base stations in the cells transmit signals at the same transmission power with respective frequencies (perch channels) different from each other. In the communication terminal 200, since the frequencies of perch channels have been known beforehand, the NW detecting section 206 can detect that the optimal base station for communications has changed by measuring the respective reception levels of perch channels of a plurality of base stations and comparing the results of measurement to each other.

In the detection of changes in a transmission quality, on the other hand, the communication terminal 200 measures various transmission quality indices in the NW communicating sections 208 during communications. For example, SIR, which is the ratio in power between signal and interference, is uniquely related to the bit error rate and frame non-reception rate, which are transmission qualities of information, so that the bit error rate and frame non-reception rate become lower as the SIR is higher. According to the SIR measured by utilizing it, changes in an electromagnetic wave environment are detected. Also, measurement of the bit error rate in a pilot signal makes it possible to measure transmission loss. The pilot signal is a signal whose contents have been known beforehand on the receiving side, so that a transmission quality can be measured when how much this signal is erroneously transmitted is verified, whereby changes in the electromagnetic wave environment are detected. Also, transmission delay time is one of transmission qualities. The transmission delay time is obtained when the time required for sending a measurement packet for measuring transmission delay from the communication terminal 200 to a base station and then sending back this measurement packet from the base station to the communication terminal 200 is measured. This can also be utilized for detection since, when the electromagnetic wave environment changes, the number of resending operations for transmission may change, for example, thereby affecting the transmission delay.

Also, the object to be inspected may be changes in surrounding environments provided by the surroundings of a terminal, such as a ride on a bus or train. Therefore, changes in surrounding environments detected by information provided by local wireless means such as wireless LANs, infrared communications, and Bluetooth can become the object to be inspected. The NW detecting section 206 in the communication terminal 200, and the environment detecting section 310 in the information terminal 300 are provided with local wireless interfaces. Local wireless systems have been introduced into buses, trains, buildings of libraries and the like, and so forth, in which the communication terminal 200 and information terminal 300 can receive signals by way of their interfaces, whereas changes in surrounding environments can easily be detected if the system is constructed so as to notify that it is inside a moving body such as a bus or train, for example, or inside a building, while the terminals can obtain this notification from signals received by the interfaces.

The object to be inspected may be changes in capabilities of a terminal such as a change from a terminal capable of displaying high-density images to one incapable thereof. In this case, modifications in the configuration accompanying changes in terminal capabilities can also be detected automatically in the NW control section 102 of the network NW100, the communication terminal 200, and the like.

Modifications in networks in use, such as those in a case where a communication path is changed to a network having a different transmission quality, terminal capability, or the like, may become the object to be inspected. An example of this case is one where a communication terminal which can utilize both of a cellular mobile communication system and a wireless LAN system is switched between these different networks. In the case where the communication terminal 200 is initially communicating in the cellular mobile communication system, whether the wireless LAN system, which is the other system, can be utilized or not is determined by measuring the reception level or the like in the NW detecting section 206. In the case where the wireless LAN system is more favorable for the user from the viewpoints of transmission quality, capability, and the like while communications are possible, switching (changing) is carried out between the systems (networks).

Also, changes in provided contents, such as those in the case where contents including moving images and sounds are switched to contents including still images and texts, can become the object to be inspected. In this case, changes in the provided contents can be detected if the contents provided by the contents server group 500 are managed in a centralized manner by the contents managing section 116 of the network NW100 and the like.

Notification of Change

When an environmental change or capability change is detected concerning the above-mentioned object to be inspected, its related apparatus or function is notified of the result of detection. Namely, information needed after the change or information concerning the media to be used, a required quality, and the like are reported to necessary apparatus and the like, whereby a network resource required for transmission is secured. For example, a change in the environment where the object to be inspected exists or in the capability thereof is reported from the terminal or the like to the network NW100, or vice versa.

Setup of New Environment

Each apparatus or function thus notified of the change secures a resource and the like, and sets up a communication environment (a wireless channel, transmission means within a network, or the like). For example, when the network NW100 is notified, under the control of the control section 110 in the NW control section 102, the resource managing section 112 reallocates resources, the line switching section 114 allocates network lines satisfying required transmission quality, the contents managing section 116 investigates media of provided contents and the like, and the information converting section 118 prepares for converting media and so forth.

Switch to New Environment

Each apparatus or function having completed the setup as mentioned above switches to a new communication environment or the like.

Therefore, while communication environments and the like have not conventionally been switchable in response to user environments, the mobile communication system according to the present invention and the resource switching method thereof can automatically execute switching in response to environments. For example, switching in the same media is possible in such a manner that, in order to attain stronger resistance to errors in the state where the transmission quality is unfavorable, the audio codec is changed to one with a decreased amount of audio information and increased information bits for correcting errors, the sound quality is changed in conformity to surrounding environments, the size and fineness of letters are changed so as to be easily seen by users, and so forth. In addition, switching between different media is possible, for example, such that visual information is automatically switched to audio information when the surroundings become dark.

Further, if the setup is effected such that contents and communication means are converted and switched automatically in response to changes in the capability of a terminal, or so as to secure and modify resources such that each function of the network, wireless transmission, and terminal responds to a change from contents consisting of text information alone to contents including visual information, the apparatus, functions, and the like can be switched in a form conforming to a condition required for contents.

Here, one skilled in the art can readily see that the mobile communication system and the resource switching method thereof are applicable to bidirectional communications such as videophone systems.

An example of operations of thus configured mobile communication system according to the present invention and the resource switching method thereof will now be explained with reference to FIGS. 7 to 10.

(1) Case where a change in an environment surrounding a terminal is detected, and a media conversion for contents is carried out.

Figure 7:
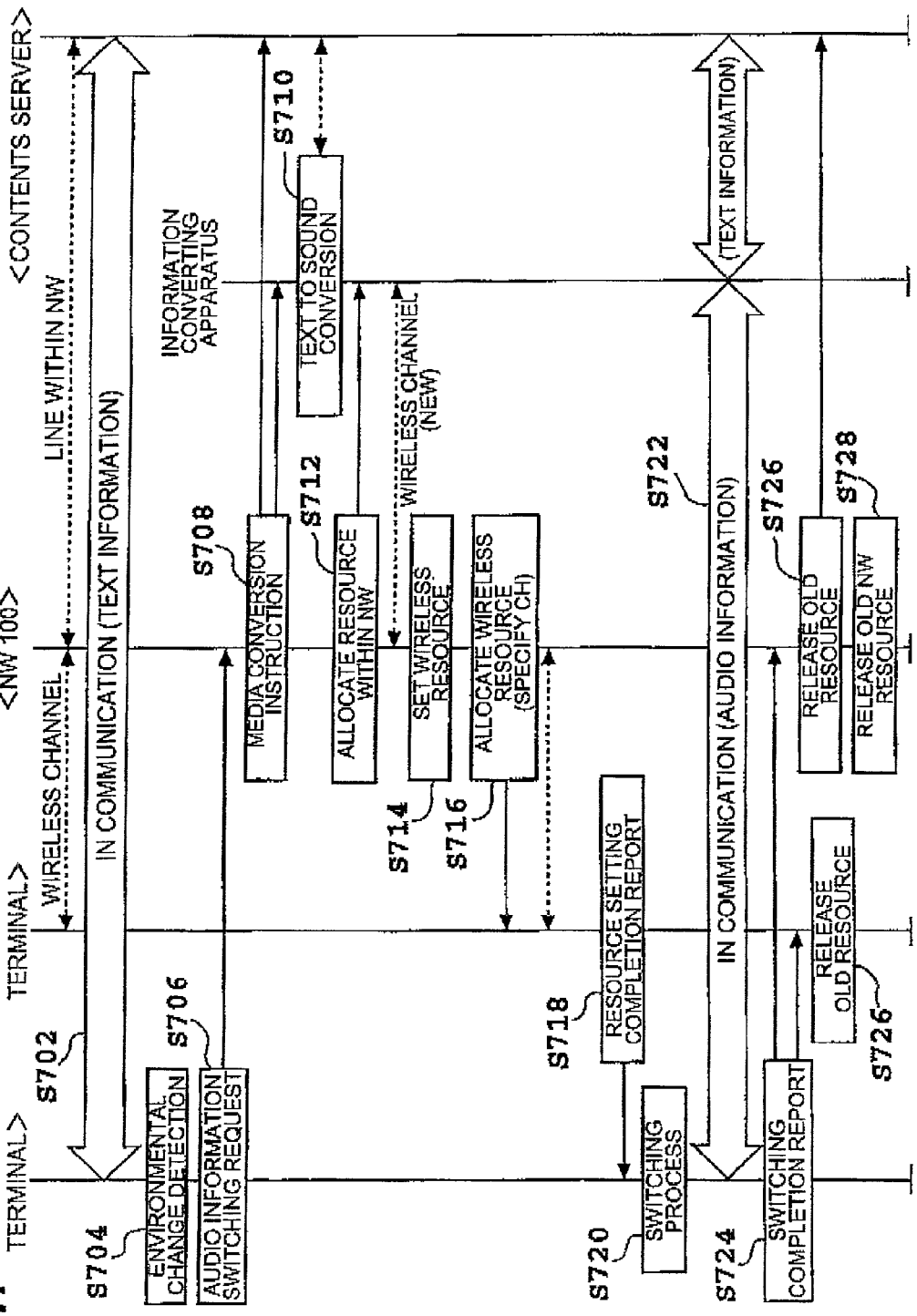
FIG. 7 is a chart showing an example of communication sequence in a case (media conversion) where, in response to a change in an environment surrounding a terminal, contents transmitted to the terminal are changed from text information to audio information in the mobile communication system according to the present invention and the resource switching method thereof.

FIG. 7 is a chart showing an example of communication sequence in the case where contents transmitted to a terminal are changed from text information to audio information when an optical sensor detects that the surroundings of the terminal have become dark. Here, FIG. 7 conceptually shows only the part relating to the present invention in the communication sequence.

First, the information terminal 300 receives contents of text information from the contents server group 500 by way of the network NW100 (step S702).

The environment detecting section 310 of the information terminal 300 detects an environmental change when the surrounding brightness is lower than a predetermined threshold (step S704). When notified of the environmental change, the control section 302 refers to setup information stored in the storage section 316 for responding to the change. Then, the control section 302 prepares for allocating various resources so as to change the contents from text information to audio information according to the referred setup information.

Subsequently, the control section 302 transmits an audio information switching request to the communication terminal 200 by way of the communication interface 312, whereas the audio information switching request is sent to the control section 110 of the network NW100 by way of the communication terminal 200 (step S706).

The control section 110 of the NW control section 102 notifies the contents managing section 116 and information conversion managing section 118 to change text information to audio information (media conversion instruction), and also instructs the corresponding information converting apparatus 400 and contents server group 500 to do so by way of the service server interface section 106 (step S708). As a consequence, the text information provided by the contents server group 500 is fed into the information converting apparatus 400, and this text information is converted into audio information in the information converting apparatus 400 (step S710). The conversion from text information to audio information in the information converting apparatus 400 can be effected by utilizing a text/sound converting apparatus shown in Japanese Patent Application Laid-Open No. HEI 5-165486, and the like, for example.

The control section 110 of the NW control section 102 notifies the resource managing section 112 to change a resource within the network NW to a resource corresponding to an audio signal, e.g., a network resource of a line switching scheme, whereby the resource managing section 112 allocates resources in the network NW including a connection from the information converting apparatus 400 to the terminal (step S712). On the other hand, the control section 110 of the NW control section 102 notifies the resource managing section 112 to change a wireless resource to a resource corresponding to the audio signal, whereby the resource managing section 112 sets and allocates wireless resources (step S714 to step S716).

After the resources are completely allocated, a resource setting completion report is transmitted from the communication terminal 200 to the information terminal 300 (step S718). In the information terminal 300, switching of resources is executed (step S720), and contents of audio information are received (step S722). Also, the information terminal 300 notifies the communication terminal 200 and the NW control section 102 of the network NW100 of the switching completion report (step S724).

Due to the foregoing operation, not only various old resources are released in the communication terminal 200, network NW100, information converting apparatus 400, and contents server 500 (step S726), but also the old network resources in wireless channel and in lines within the network NW100 (lines within the NW) are released (step S728).

Though the above-mentioned embodiment exemplifies a case where the communication terminal 200 and information terminal 300 are realized as housings independent from each other, i.e., as the separate type information communication terminal 250a (see FIG. 1), the information communication terminal is not restricted to such a form, whereas one housing in which the communication terminal and information terminal are appropriately assembled together, i.e., the integrated information communication terminal 250b (see FIG. 1), may be employed as well.

(2) Case where a change in a wireless environment (transmission capability) is changed, and the rate of image codec is converted.

Figure 8:
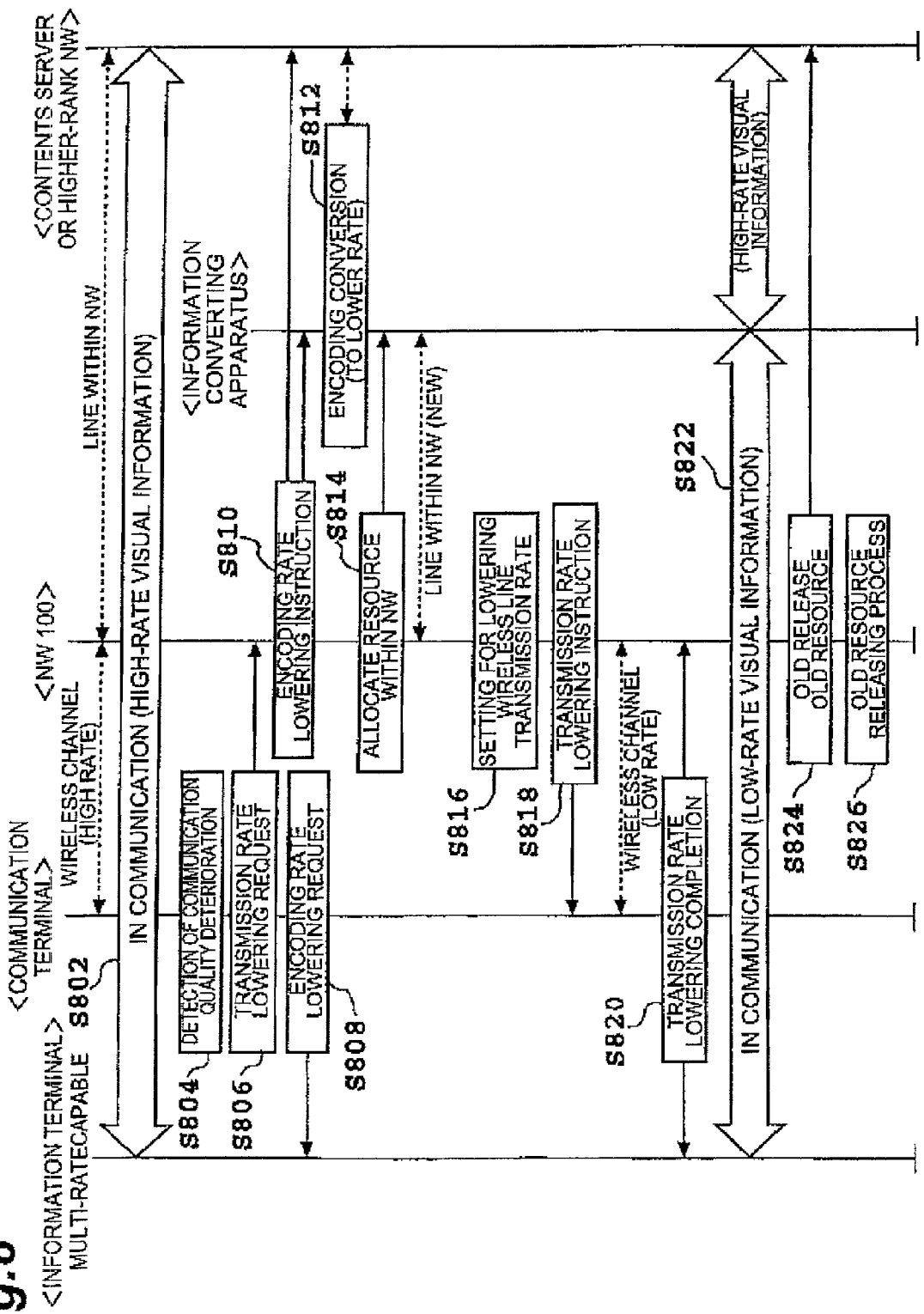
FIG. 8 is a chart showing an example of communication sequence in a case where the rate of an image codec is changed in response to a change in a wireless environment (transmission capability) in the mobile communication system according to the present invention and the resource switching method thereof.

FIG. 8 is a chart showing an example of communication sequence in the case where a change in a wireless environment (transmission capability) is detected, and the rate of image codec is converted. Here, FIG. 8 conceptually shows only the part relating to the present invention in the communication sequence.

First, the information terminal 300 receives high-rate visual information contents from the contents server group 500 by way of the network NW100 (step S802). Also, wireless channel have a high-rate transmission capability.

The NW communicating section 208 of the communication terminal 200 detects a deterioration in a communication environment when the communication quality exceeds a predetermined threshold (step S804). When detecting the environmental deterioration, the control section 202 refers to the setup information stored in the storage means within the communication terminal 200 for responding to the deterioration. Then, according to thus referred setup information, the control section 202 prepares for allocating various resources so as to change the visual information transmission rate to low-rate visual information. Further, by way of the NW communicating section 208, the control section 202 transmits a transmission rate lowering request to the control section 110 managing the network NW100 (step S806).

Here, the communication terminal 200 sends an encoding rate lowering instruction to the information terminal 300 (step S808).

The control section 110 of the NW control section 102 notifies the contents managing section 116 and information conversion managing section 118 to change the visual information to low-rate visual information, and instructs the corresponding information converting apparatus 400 and contents server group 500 to do so by way of the service server interface section 106 (step S810). As a consequence, the high-rate visual information provided by the contents server group 500 is fed into the information converting apparatus 400, whereby the high-rate visual information is converted into low-rate visual information in terms of encoding in the image converting apparatus 400 (step S812).

The control section 110 of the NW control section 102 notifies the resource managing section 112 to change a resource within the network NW100 to a resource corresponding to a low-rate image signal, whereby the resource managing section 112 allocates resources within the network NW100 (step S814).

For changing a wireless resource to a resource corresponding to the low-rate image signal, the control section 110 of the NW control section 102 notifies the resource managing section 112 to lower the wireless channel transmission rate, whereby thus notified resource managing section 112 sets and allocates wireless resources (step S816 to step S818).

After resources are completely allocated, a transmission rate lowering completion report is transmitted from the communication terminal 200 to the information terminal 300 and the network 100 (step S820). In the information terminal 300, on the other hand, switching of resources is executed, whereby contents are received a low-rate visual information (step S822).

Due to the foregoing operation, not only various old resources are released in the network NW100, information converting apparatus 400, and contents server 500 (step S824), but also the old network resources in wireless channel and in lines within the network NW100 (lines within the NW) are released (step S826).

Though the above-mentioned embodiment exemplifies a case where the rate of image codec is lowered, it is also applicable to media conversions to data having a small amount of information such as text information, for example. Also, though the above-mentioned embodiment exemplifies a case where the communication terminal 200 and information terminal 300 are realized as housings independent from each other, i.e., as the separate type information communication terminal 250a (see FIG. 1), the information communication terminal is not restricted to such a form, whereas one housing in which the communication terminal and information terminal are appropriately assembled together, i.e., the integrated information communication terminal 250b (see FIG. 1), may be employed as well.

(3) Case where a change in the position of a terminal is detected, and media and transmission means for contents are converted.

Figure 9:
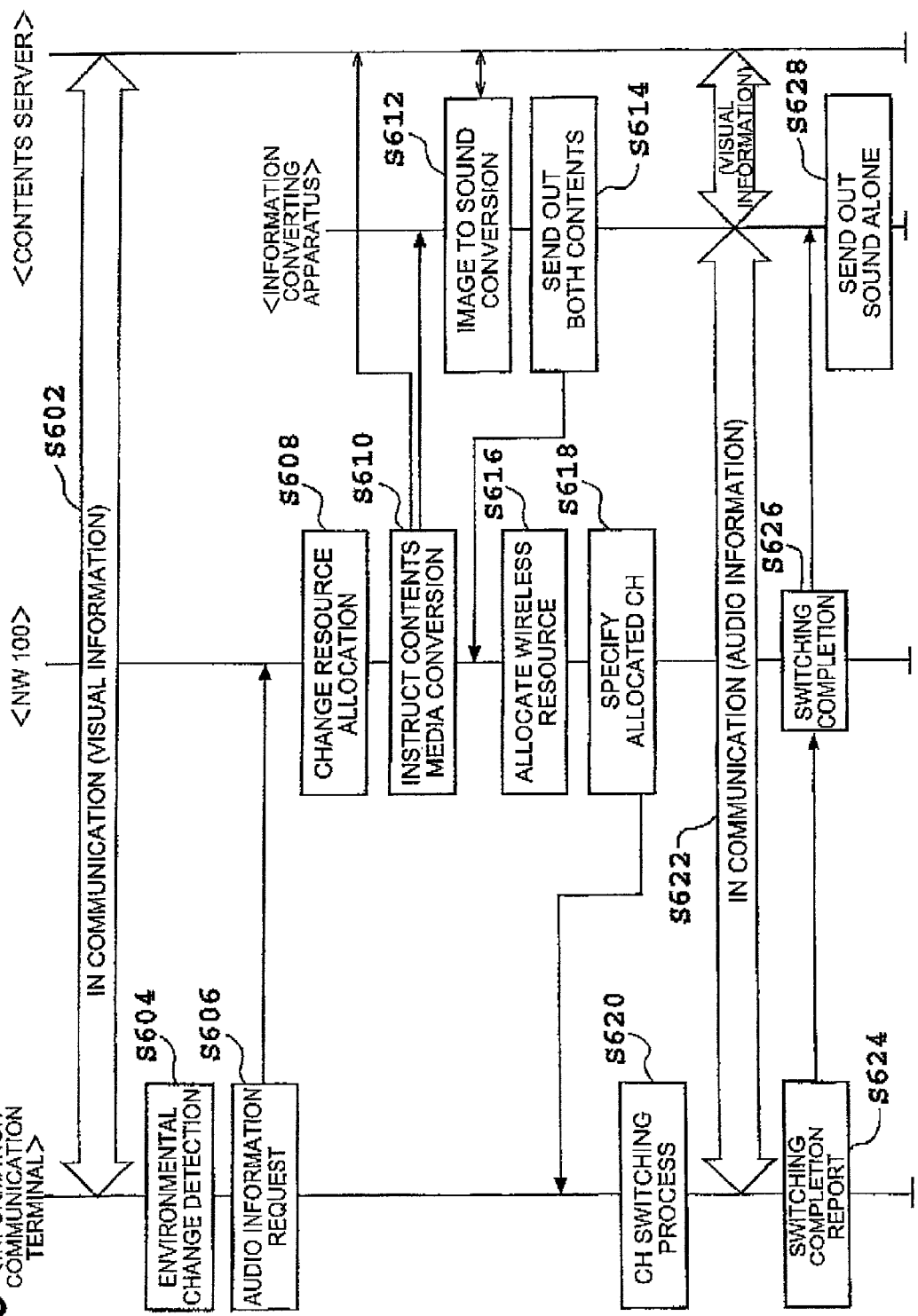
FIG. 9 is a chart showing an example of communication sequence in a case where media and transmission means for contents are changed in response to a change in an environment surrounding a terminal in the mobile communication system according to the present invention and the resource switching method thereof.

FIG. 9 is a chart showing an example of communication sequence in the case where a change in the position of a terminal is detected, and media and transmission means for contents are converted. Here, FIG. 9 conceptually shows only the part relating to the present invention in the communication sequence.

First, the information communication terminal 250b (comprising the structure shown in FIGS. 3 and 4) receives contents of visual information from the contents server group 500 by way of the network NW100 (step S602). Here, the network NW100 is a network suitable for transmitting/receiving visual information, e.g., a packet switching type network or the like.

The environment detecting section 310 of the information communication terminal 250*b* detects an environmental change when the change in terminal position exceeds a predetermined threshold (step S604). The detection of change may also be effected, for example, when a change the cell which terminal is located is detected by a cell determination, the terminal measures its own position according to GPS, a movement is detected by an acceleration sensor installed in the terminal, and so forth. When notified of the environmental change, the control section 302 refers to the setup information stored in the storage section 316 for responding to the change. Then, according to thus referred setup information, the control section 302 prepares for allocating various resources so as to change contents from visual information to audio information.

When resources are completely allocated, an audio information request signal is transmitted from the information communication terminal 250*b* to the control section 110 of the network NW100 by way of the communication interface 312 (step S606).

Upon receiving the audio information request signal, the control section 110 of the NW control section 110 notifies the resource managing section 112 to change a resource to a resource corresponding to an audio signal (step S608). Further, the control section 110 of the new control section 102 notifies the contents managing section 116 and information conversion managing section 118 to change information into audio information, and instructs the corresponding information converting apparatus 400 and contents server group 500 to do so by way of the service server interface section 106 (step S610). As a consequence, the visual information provided by the contents server group 500 is fed into the information converting apparatus 400.

In the information converting apparatus 400, the visual information provided by the contents server group 500 is converted into audio information (S612). Also, the information converting apparatus 400 transmits both audio and visual contents to the network NW100 (step S614). This aims at preventing information from losing at the time when switching network resources.

When it is verified in the contents managing section 116 of the NW control section 102 that both audio and visual information items are transmitted, the NW control section 110 of the NW control section 102 changes various resources corresponding to the communication terminal 200 with respect to the resource managing section 112 and line switching section 114. Namely, the line switching section 114 instructs the wireless interface section 104 and gateway section 108 to change resources (step S616).

Here, by way of the wireless interface section 104, the NW control section 102 specifies a channel allocated to the information communication terminal 250 and the like (step S618). Also, the information communication terminal 250*b* carries out a switching operation for a communication channel or the like (step S620), and receives audio information contents by way of thus switched channel (step S622).

Upon receiving the switching completion report from the information communication channel 250*b*, the network NW100 carries out processing for completing channel switching (step S626), release old resources of the network NW100, and instructs the information converting apparatus 400 to transmit audio information alone. Thereafter, the information communication terminal 250*b* receives only audio information by way of the information converting apparatus 400 (step S628).

Here, if the information communication terminal 250*b* moves out of the service area of the network NW100 (hereinafter referred to as network NW1) or fails to connect with the current network NW100 due to a deterioration in the status of propagation and the like, communications can be continued by switching to another network (hereinafter referred to as network NW2). In this case, an audio information request signal and an NW switching request signal to the network NW2 are sent out. The network NW1 having received the request for switching to the network NW2 requests the NW2 to set a resource necessary for communications, and instructs the information converting apparatus 400 to execute the above-mentioned step S614 for the network NW2 as well. The network NW2 sets a resource in response to the setting request, and transmits to the network NW1 notifications of the completion of resource setting and the destination to which the wireless communication channel is switched. The network NW1 having received the notifications executes the above-mentioned step S618 without carrying out the above-mentioned step S616. Subsequently, the information communication terminal 250 executes the above-mentioned step S620, and carries out communications in the above-mentioned step S622 by way of the network NW2. Also, in the above-mentioned step S624, the information communication terminal 250*b* transmits a notification of the completion of switching to the network NW2, whereby the network NW2 executes the above-mentioned step S626. The network NW2 notifies the network NW1 that processing for completing the switching is executed, whereby thus notified network NW1 releases resources.

Though the above-mentioned switching process from the network NW1 to another network NW2 is a network-driven switching process in which the network NW1 sends an NW switching request signal to the network NW2, it may also be a terminal-driven switching process in which the information communication terminal 250*b* itself directly transmits the NW switching request signal to the network NW2, so as to carry out switching.

Though the above-mentioned embodiment explains a case where the information communication terminal 250*b* is utilized, the separate type information communication terminal 250*a* (communication terminal 200+information terminal 300) may also be utilized.

(4) Application to a Video Conference System

A case where the mobile communication system according to the present invention is applied to a video conference system will now be explained in detail with reference to FIG. 10.

Figure 10:
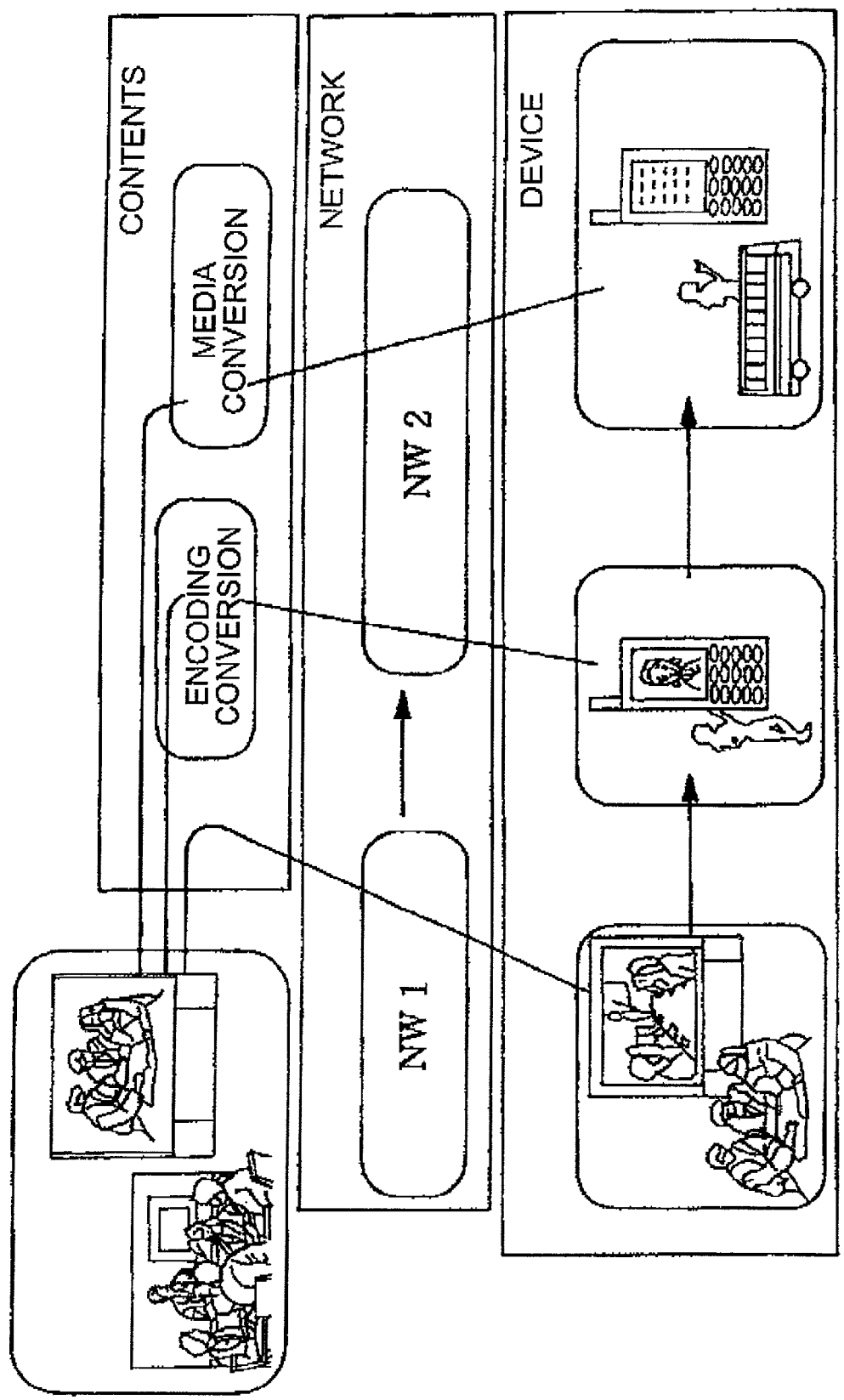
FIG. 10 is a view showing an example of image realizing a video conference employing the mobile communication system according to the present invention.

FIG. 10 is a view showing an example of image realizing a video conference employing the mobile communication system according to the present invention. Here, FIG. 10 conceptually shows only the part of video conference system relating to the present invention. Also, the following explanation exemplifies a case where a change in terminal capability or in transmission capability of a wireless area is detected, and an encoding conversion is carried out.

First, it is assumed that a video conference is held by use of a large-size TV set with a party in another office connected with a VPN by way of a wireless LAN (network NW1). Here, if one of parties of the video conference goes outdoor with a mobile phone, the network NW1 is notified of the change in terminal, whereby the communication network is automatically changed from the wireless LAN (network NW1) to a mobile communication network (another network NW2), whereas contents are converted from high-definition visual information for the large-size TV set to a high-compression visual information for a mobile terminal.

When a participant rides on a bus with a mobile phone, an environmental change is detected by local wireless means such as Bluetooth installed in the bus, whereby contents are automatically converted from audio information to text information, and then are provided.

As in the foregoing, employing the mobile communication system according to the present invention enables "network seamless" for roaming between different kinds of networks, "contents seamless" for converting different kinds of encoding or media therebetween, and "device seamless" for making it possible to utilize optimum I/O devices in conformity to surrounding environments. Here, one skilled in the art can readily see that the mobile communication system according to the present invention can be carried out in bidirectional communications such as videophone systems, for example.

Other Embodiments

Though the foregoing explanation exemplifies a case where embodiments of the mobile communication system according to the present invention and the resource switching method thereof are realized independently, the present invention should not be restricted to the above-mentioned embodiments. For example, one skilled in the art can readily see that the above-mentioned embodiments can be combined together. Also, while the above-mentioned embodiments exemplify a case where the NW control section 102, wireless interface section 104, service server interface section 106, gateway section 108, information converting apparatus 400, and contents server group 500 are shown as independent network resources, one skilled in the art can readily see that the above-mentioned embodiments can be carried out in apparatus in which any parts of these constituents are combined together as appropriate.

Though the above-mentioned embodiment exemplifies the service, system, scheme, and the like of NTT DoCoMo, Inc. (company name), it is also applicable to services, systems, schemes, and the like of other companies having similar functions.

Further, though the above-mentioned embodiment exemplifies the procedure of allocating new resources and releasing old resources, one skilled in the art can readily see that, without changing a physical channel in a wireless area or network NW, its transmission rate or the encoding rate of contents to be communicated can be changed alone as required.

From the foregoing explanations, it will be obvious that the present invention may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

In the present invention, as mentioned above, if an environmental change concerning any object is detected in any of apparatus of a mobile communication system, e.g., a mobile terminal, an information processing apparatus connected to the terminal, a node within a communication network, a node connected to the network, and the like, at least one apparatus relating to the change is notified of the result of detection, whereby various resources are set up and switched in thus notified apparatus so as to respond to a new environment. This automatically eliminates seams (restrictions) resulting from changes in communication environment and terminal capabilities and the like, whereby a seamless network is constructed with respect to various environmental changes. Namely, the present invention enables "network seamless" for roaming between different kinds of networks, "contents seamless" for converting different kinds of encoding or media therebetween, and "device seamless" for making it possible to utilize optimum I/O devices in conformity to surrounding environments.

Also, though the conventional mobile communication system have failed to automatically switch communication environments and the like in response to user environments, the present invention can automatically execute switching in response to environments. Different qualities in the same media can also be switched.

Further, the present invention enables switching between different media, and also makes it possible to modify apparatus and functions in a form conforming to conditions under which contents are required.

The invention claimed is:

1. A mobile communication system capable of transferring information transmitted/received by a mobile terminal and including a network that has a predetermined resource therein, said network comprising:
   detecting means for detecting one or more changes generated within an area assigned to one base station while a communication between said mobile terminal and said assigned one base station is established, said changes including at least one of change in a communication environment in which an object to be inspected exists, said change in the communication environment having the possibility of becoming a seam in mobile communication, and a change in a capability of said object to be inspected;
   reporting means for notifying one or more apparatuses relating to said change detected by said detecting means of a result of said detection;
   setting means for newly setting at least one of a network resource and a media type in conformity to said change detected by said detecting means, for automatically eliminating at least one of a network seam, content seam and device seam which are caused by said detected change; and
   switching means for switching said network resource and media type into a content set by said setting means.

2. A mobile communication system according to claim 1, wherein said object to be inspected includes at least one of a communication terminal, transmission means for a radio area, and transmission means within a network.

3. A mobile communication system according to claim 1, wherein said network resource includes at least one of a wireless communication channel, a transmitter/receiver, a line within a network, a communication node apparatus, a communication terminal, an information switching apparatus, and an information converting apparatus.

4. A mobile communication system according to claim 1, wherein said switching means includes information converting apparatus which carries out, as said switching of information format, at least one of changing of media for information transferred over a network and changing of a transmission quality between the same media.

5. A resource switching method for a mobile communication system capable of transferring information transmitted/received by a mobile terminal and including a network that a predetermined resource therein, said method comprising the steps of:

detecting, in said network side, one or more changes generated within an area assigned to one base station while a communication between said mobile terminal and said assigned one base station is established, said changes including at least one of a change in a communication environment in which an object to be inspected exists, said change in the communication environment having the possibility of becoming a seam in mobile communication, and a change in a terminal capability of said object to be inspected;

notifying one or more apparatuses relating to said change detected by said detecting step of a result of said detection;

setting at least one of a network resource and a media type in conformity to said change detected by said detecting step, for automatically eliminating at least one of a network seam, content seam and device seam which are caused by said detected change; and switching, in said network side, said network resource said network resource and said media type into a content set by said setting step.

6. A resource switching method for a mobile communication system according to claim 5, wherein said object to be inspected includes at least one of a communication terminal, transmission means for a radio area, and transmission means within a network.

7. A resource switching method for a mobile communication system according to claim 5, wherein said network resource includes at least one of a wireless communication channel, a transmitter/receiver, a line within a network, a communication node apparatus, a communication terminal, an information switching apparatus, and an information converting apparatus.

8. A resource switching method for a mobile communication system according to claim 5, wherein said switching step includes a step of carrying out, as switching of said information format, at least one of changing of media for information transferred over a network and changing of a transmission quality in the same media.

9. A network control method in a mobile communication system capable of transferring information transmitted/received by a mobile terminal and including a network that has a predetermined resource therein, said method comprising the steps of:

detecting, in said network side, one or more changes generated within an area assigned to one base station while a communication between said mobile terminal and said assigned one base station is established, said changes including at least one of a change in a communication environment in which an object to be inspected exists, said change in the communication environment having the possibility of becoming a seam in mobile communication, and a change in a terminal capability of said object to be inspected;

determining at least one of a network resource and a media type suitable for said change specified by said detection, for automatically eliminating at least one of a network seam, content seam and device seam which are caused by said detected change; and controlling said object to be inspected concerning at least one of said determined network resource and media type so that said object to be inspected conforms to said detected change.

10. A network control method according to claim 9, wherein said object to be inspected includes at least one of a communication terminal, transmission means for a radio area, and transmission means within a network.

11. A network control method according to claim 9, wherein said network resource includes at least one of a wireless communication channel, a transmitter/receiver, a line within a network, a communication node apparatus, a communication terminal, an information switching apparatus, and an information converting apparatus.

12. A network control apparatus constituting a part of a network that has a predetermined resource and that is included in a mobile communication capable of transferring information transmitted/received by a mobile terminal, said network control apparatus comprising receiving means for receiving a detection report, detected in said network side, of one or more changes generated within an area assigned to one base station while a communication between said mobile terminal and said assigned one base station is established, said changes including at least one of a change in a communication environment in which an object to be inspected exists, said change in the communication environment having the possibility of becoming a seam in mobile communication, and a change in a terminal capability of said object to be inspected;

determining means for determining at Least one of a network resource and a media type suitable for said change specified by said detection report, for automatically eliminating at least one of a network seam, content seam and device seam which are caused by said detected change; and control means for controlling said object to be inspected concerning at least one of said determined network resource and media type so that said object conforms to said detected change.

13. A network control apparatus according to claim 12, wherein said object to be inspected includes at least one of a communication terminal, transmission means for a radio area, and transmission means within a network.

14. A network control apparatus according to claim 12, wherein said network resource includes at least one of a wireless communication channel, a transmitter/receiver, a line within a network, a communication node apparatus, a communication terminal, an information switching apparatus, and an information converting apparatus.

15. A mobile communication system capable of transferring information transmitted/received by a mobile terminal and including a network that has a predetermined resource therein, said network comprising:

a detector configured to detect one or more changes generated within an area assigned to one base station while a communication between said mobile terminal and said assigned one base station is established, said changes including at least one of a change in a communication environment in which an object to be inspected exists, said change in the communication environment having the possibility of becoming a seam in mobile communication, and a change in a terminal capability of said object to be inspected;

a transmitter configured to notify one or more apparatuses relating to said change detected by said detecting means of a result of said detection;

a controller configured to set at least one of a network resource and a media type in conformity to said change detected by said detecting means, for automatically eliminating at least one of a network seam, content seam and device seam which are caused by said detected change; and said controller configured to switch said network resource and media type into a content set by said setting means.

16. A network control apparatus constituting a part of a network having a predetermined resource and included in a mobile communication capable of transferring information transmitted/received by a mobile terminal, said network control apparatus comprising a receiver configured to receive a detection report, detected in said network side, of one or more changes generated within an area assigned to one base station while a communication between said mobile terminal and said assigned one base station is established, said changes including at least one of a change in a communication environment in which an object to be inspected exists, said change in the communication environment having the possibility of becoming a seam in mobile communication, and a change in a terminal capability of said object to be inspected from said object to be inspected;

a processor configured to determined at least one of a network resource and a media type suitable for said change specified by said detection report received from said object to be inspected, for automatically eliminating at least one of a network seam, content seam and device seam which are caused by said detected change; and a controller configured to control said object to be inspected concerning at least one of said determined network resource and media type so that said object to be inspected conforms to said detected change.

* * * * *

UNITED STATES PATENT AND TRADEMARK OFFICE
CERTIFICATE OF CORRECTION

PATENT NO. : 7,142,847 B2  Page 1 of 1
APPLICATION NO. : 10/089081
DATED : November 28, 2006
INVENTOR(S) : Umeda et al.

It is certified that error appears in the above-identified patent and that said Letters Patent is hereby corrected as shown below:

On the title page, Item (54), and Column 1, the Title information is incorrect. Item (54) and Column 1 should read:

-- (54) MOBILE COMMUNICATION SYSTEM, RESOURCE SWITCHING METHOD THEREOF, NETWORK CONTROL APPARATUS INCLUDED THEREIN, AND NETWORK CONTROL METHOD --

Signed and Sealed this

Sixth Day of March, 2007

JON W. DUDAS
*Director of the United States Patent and Trademark Office*